(12) United States Patent
Tseng (10) Patent No.: US 8,763,342 B2
(45) Date of Patent: Jul. 1, 2014

(54) CORNER KEY AND FRAME ASSEMBLY

(75) Inventor: Huang-Chi Tseng, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 27 days.

(21) Appl. No.: 13/402,894

(22) Filed: Feb. 23, 2012

(65) Prior Publication Data

US 2013/0019558 A1    Jan. 24, 2013

(30) Foreign Application Priority Data

Jul. 21, 2011    (TW) .............................. 100125778 A (51) Int. Cl.
*E04C 2/38*    (2006.01)
*E06B 3/964*    (2006.01)

(52) U.S. Cl.
CPC ............. *E06B 3/9644* (2013.01); *E06B 3/9645* (2013.01)
USPC ........................... 52/656.9; 403/295; 403/402

(58) Field of Classification Search
CPC ...... A47G 1/10; A47G 1/0605; E06B 3/9682; E06B 3/9845; E06B 3/982; E06B 3/96; E06B 3/9645; E06B 3/9885; E06B 3/9765; E06B 3/9644; E06B 3/9648; E06B 3/962; E06B 3/968; F16B 12/46; F16B 12/50; F16B 12/44; F16B 7/0486; F16B 5/0052; F16B 3/00; E04B 2/766; E04B 2001/2409; E04B 2/761; A47B 47/0008; E04C 2/384; G09F 15/0012; B29C 66/52431; B29C 66/1162

USPC ................. 52/656.9, 658, 656, 656.1, 656.7; 403/402, 295, 205, 401, 298

See application file for complete search history.

(56) References Cited

U.S. PATENT DOCUMENTS

| | | | | |
|---|---|---|---|---|
| 2,101,349 A * | 12/1937 | Sharp | ............................. | 403/280 |
| 2,451,076 A * | 10/1948 | Edwards, Jr. | ................. | 403/295 |
| 2,897,927 A * | 8/1959 | Fitzgerald | ..................... | 403/295 |
| 3,200,913 A * | 8/1965 | Nelson | ........................... | 403/294 |
| 3,269,455 A * | 8/1966 | Gillotti | ........................ | 160/369 |

(Continued)

FOREIGN PATENT DOCUMENTS

DE    202 10 652 U1    1/2003
FR    2 833 641 A1    6/2003

OTHER PUBLICATIONS

Ruten (a Taiwan online shopping site), Translation of the title of the goods: Screen-door Corner Gear, The website link: http://goods.ruten.com.tw/item/show?11080429244477, Apr. 9, 2010, Abstract.

(Continued)

*Primary Examiner* — Brian Glessner
*Assistant Examiner* — Gisele Ford
(74) *Attorney, Agent, or Firm* — Winston Hsu; Scott Margo (57) ABSTRACT

A corner key includes a first body and a first engaging portion. The first body has a first slot. The first engaging portion is disposed on a surface of the first body and a position of the first engaging portion is corresponding to the first slot. The first engaging portion has a first section, a second section and a third section, wherein the first and third sections are located at opposite sides of the first engaging portion, the second section is located between the first and third sections, and a height of the second section is greater than that of the first section or the third section.

24 Claims, 11 Drawing Sheets

(56) References Cited

U.S. PATENT DOCUMENTS

| | | | | |
|---|---|---|---|---|
| 3,321,223 A * | 5/1967 | Snow et al. | | 403/220 |
| 3,467,423 A * | 9/1969 | Schlegel, Jr. et al. | | 403/270 |
| 3,603,627 A * | 9/1971 | Kaffel | | 52/656.9 |
| 3,606,419 A * | 9/1971 | Virkler et al. | | 52/656.9 |
| 3,829,226 A * | 8/1974 | Kreusel | | 403/295 |
| 3,866,380 A * | 2/1975 | Benson | | 52/656.6 |
| 3,899,258 A * | 8/1975 | Matthews | | 403/292 |
| 4,145,150 A * | 3/1979 | Rafeld | | 403/295 |
| 4,240,765 A * | 12/1980 | Offterdinger | | 403/402 |
| 4,357,744 A * | 11/1982 | McKenzie et al. | | 29/451 |
| 4,368,584 A * | 1/1983 | Logan | | 40/785 |
| 4,380,110 A * | 4/1983 | Harig | | 29/525 |
| 4,530,195 A * | 7/1985 | Leopold | | 52/717.02 |
| 4,683,634 A * | 8/1987 | Cole | | 29/412 |
| 5,040,456 A * | 8/1991 | Hayes | | 101/127.1 |
| 5,048,997 A * | 9/1991 | Peterson | | 403/295 |
| 5,071,281 A * | 12/1991 | Murphy et al. | | 403/295 |
| 5,076,736 A * | 12/1991 | Grewe et al. | | 403/295 |
| 5,154,531 A * | 10/1992 | Peterson | | 403/205 |
| 5,209,599 A * | 5/1993 | Kronenberg | | 403/298 |
| 5,479,733 A * | 1/1996 | Kusina | | 40/785 |
| 6,108,997 A * | 8/2000 | Blais et al. | | 52/656.7 |
| 6,164,036 A * | 12/2000 | Manser | | 52/656.9 |
| 6,609,349 B2 * | 8/2003 | Davidsaver | | 52/771 |
| 6,681,833 B2 * | 1/2004 | Wylie | | 160/381 |
| 6,862,859 B2 * | 3/2005 | Kronenberg | | 52/656.9 |
| 6,898,886 B1 * | 5/2005 | Montecalvo | | 40/740 |
| 7,634,880 B2 * | 12/2009 | Sironko et al. | | 52/456 |
| 7,739,851 B2 * | 6/2010 | Davis et al. | | 52/656.9 |
| 8,015,763 B2 * | 9/2011 | McGlinchy | | 52/204.61 |
| 8,240,107 B2 * | 8/2012 | Gallagher | | 52/656.9 |
| 8,307,596 B2 * | 11/2012 | Catalano | | 52/456 |

OTHER PUBLICATIONS

Alumet Mfg. Inc., "Air Spacer Corner Keys," The website link: http://www.alumet.com/cornerkey.htm, Oct. 10, 2007.

* cited by examiner

CORNER KEY AND FRAME ASSEMBLY

BACKGROUND OF THE INVENTION

1. Field of the Invention

The present invention relates to a corner key and a frame assembly, and more specifically, to a corner key having a slot formed thereon corresponding to an engaging portion of the corner key and a frame assembly utilizing the corner key.

2. Description of the Prior Art

Figure 1:
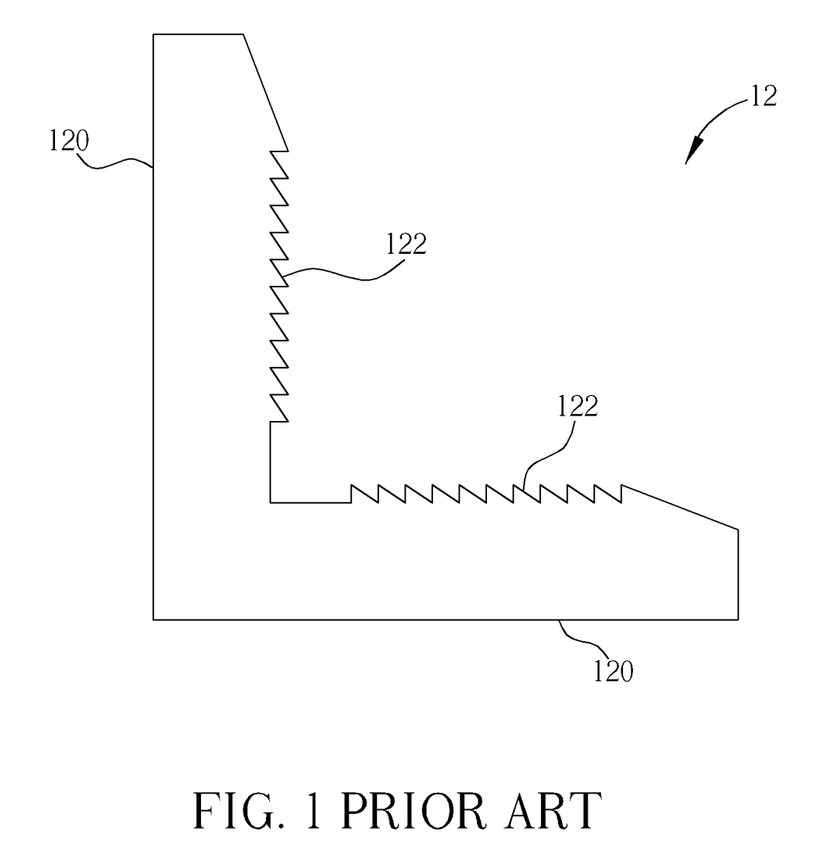
FIG. 1 is a diagram of a corner key according to the prior art.
Figure 2:
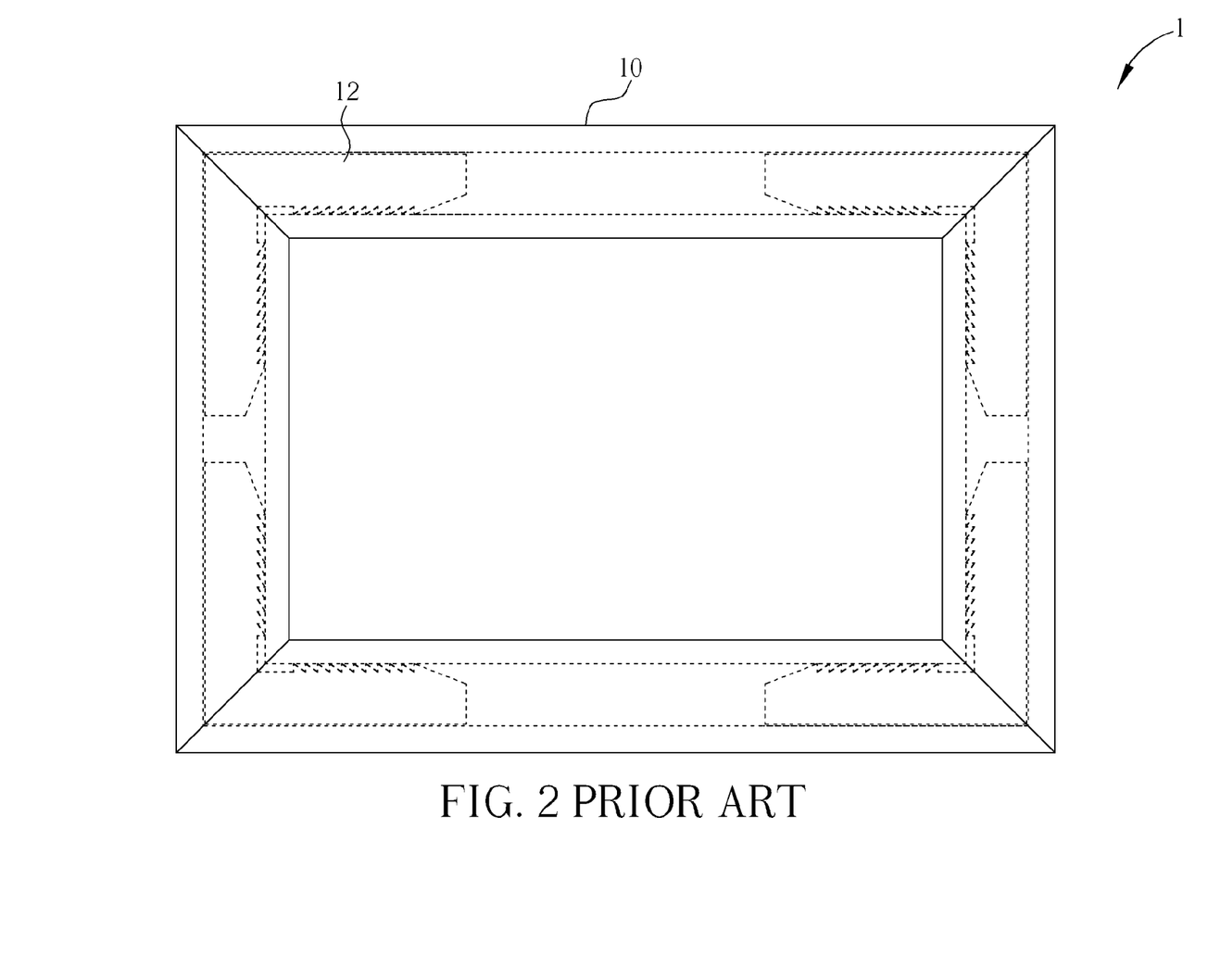
FIG. 2 is a diagram of a frame assembly utilizing the corner key in FIG. 1.

Please refer to FIG. 1 and FIG. 2. FIG. 1 is a diagram of a corner key 12 according to the prior art. FIG. 2 is a diagram of a frame assembly 1 utilizing the corner key 12 in FIG. 1. As shown in FIG. 1, the corner key 12 includes two bodies 120 which are connected to each other and form an L-shaped structure cooperatively. A tooth structure 122 is disposed on the surface of each body 120 respectively. As shown in FIG. 2, the frame assembly 1 includes four side frames 10 and four corner keys 12. Each two adjacent side frames 10 are assembled with one corner key 12 respectively.

In general, the corner key 12 is usually formed by an aluminum extrusion process. The aluminum extrusion process is a manufacturing process with low precision (thermal expansion and contraction of the aluminum after extrusion process) and an anodizing and a cutting process need to be performed on the side frame 10 after the aluminum extrusion process. Since the side frame 10 usually has burrs after being cut and assembly of the corner key 12 and the side frame 10 is usually performed in a force interference, it may cause a difficult assembly process. Furthermore, during the assembly process of the side frame 10 and the corner key 12, an included-angle error between the two bodies 120 of each corner key 12 and a displacement difference between the side frame 10 and the corner key 12 occurred in the assembly process may make an excessive assembly force applied to the corner key 12. Accordingly, not only the tooth structure 122 of the corner key 12 and the related tools may be damaged easily, but assembly precision of the side frame 10 and the corner key 12 may also be influenced, so as to reduce the production capacity of the frame assembly and increase the maintenance and replacement cost of the related process apparatuses.

SUMMARY OF THE INVENTION

The present invention provides a corner key including a first body and a first engaging portion. The first body has a first slot. The first engaging portion is disposed on a surface of the first body corresponding to the first slot and has a first section, a second section, and a third section. The first section and the third section are located at opposite sides of the first engaging portion. The second section is located between the first section and the third section. A height of the second section is greater than a height of the first section or a height of the third section.

The present invention further provides a frame assembly including a first side frame and a corner key. The first side frame has a first inner hole. The corner key includes a first body and a first engaging portion. The first body has a first slot for inserting into the first inner hole. The first engaging portion is disposed on a surface of the first body corresponding to the first slot and has a first section, a second section, and a third section. The first section and the third section are located at opposite sides of the first engaging portion. The second section is located between the first section and the third section. A height of the second section is greater than a height of the first section or a height of the third section.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
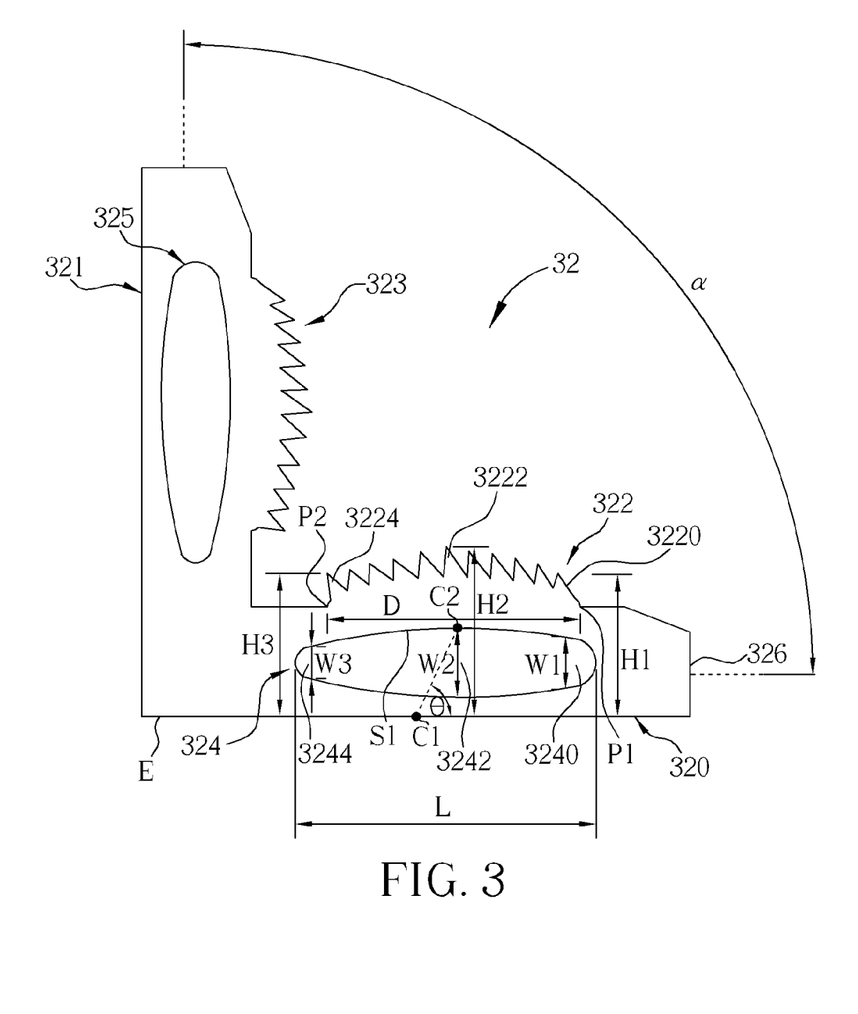
FIG. 3 is a diagram of a corner key according to an embodiment of the present invention.
Figure 4:
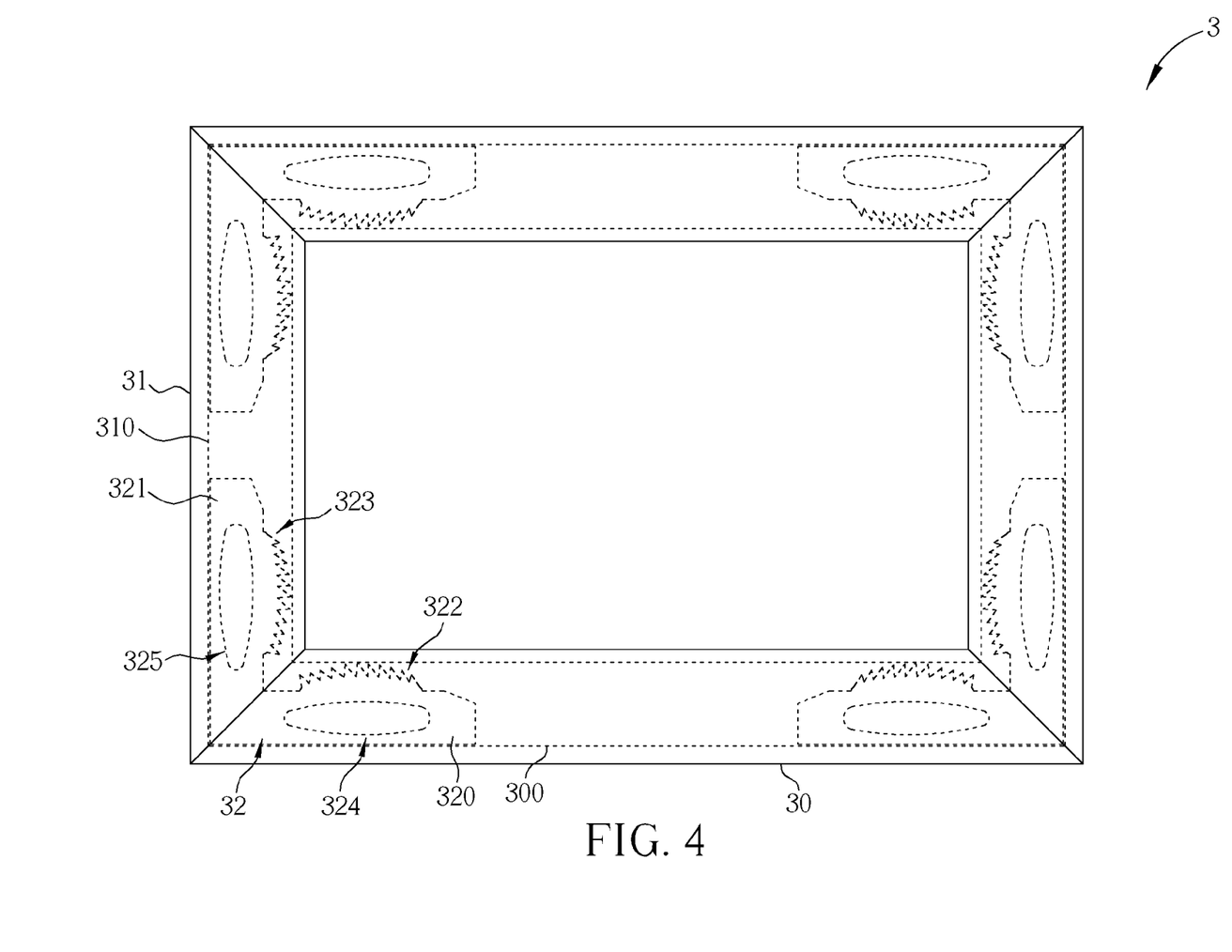
FIG. 4 is a diagram of a frame assembly utilizing the corner key in FIG. 3.

Please refer to FIG. 3 and FIG. 4. FIG. 3 is a diagram of a corner key 32 according to an embodiment of the present invention. FIG. 4 is a diagram of a frame assembly 3 utilizing the corner key 32 in FIG. 3. As shown in FIG. 3, the corner key 32 includes a first body 320, a second body 321, a first engaging portion 322, and a second engaging portion 323. The second body 321 is connected to the first body 320. An angle α is included between the first body 320 and the second body 321 to make the first body 320 and the second body 321 form an L-shaped structure cooperatively. The first body 320 has a first slot 324, and the second body 321 has a second slot 325. The first engaging portion 322 is disposed on the surface of the first body 320 corresponding to the first slot 324. The second engaging portion 323 is disposed on the surface of the second body 321 corresponding to the second slot 325.

As shown in FIG. 4, the frame assembly 3 includes two first side frames 30, two second side frames 31, and four corner keys 32. The first side frame 30 has a first inner hole 300, and the second side frame 31 has a second inner hole 310. The first body 320 of the corner key 32 is used for inserting into the first inner hole 300 of the first side frame 30, and the second body 320 is used for inserting into the second inner hole 310 of the second side frame 321. In other words, the first side frames 30 and the adjacent second side frame 31 are assembled with each other by one corner key 32.

In this embodiment, the structures of the second body 321, the second slot 325, and the second engaging portion 323 are substantially identical to the structures of the first body 320, the first slot 324, and the first engaging portion 322. Thus, only the structural designs of the first body 320, the first slot 324, and the first engaging portion 322 are described in details as follows for simplicity.

As shown in FIG. 3, the first engaging portion 322 has a first section 3220, a second section 3222 and a third section

3224. The first section 3220 and the third section 3224 are located at opposite sides of the first engaging portion 322. The second section 3222 is located between the first section 3220 and the third section 3224. A height H2 of the second section 3222 is greater than a height H1 of the first section 3220 or a height H3 of the third section 3224. To be noted, the height H1 of the first section 3220 can be equal to or different from the height H3 of the third section 3224.

In this embodiment, the first body 320 has a long body side E, and the first slot 324 has a long slot side S1. An acute angle θ is included between the first body 320 and a line from a middle point C1 of the long body side E to a middle point C2 of the long slot side S1. A distance between the middle point C2 of the long slot side S1 and the first section 3220 is less than a distance between the middle point C2 of the long slot side S1 and the third section 3224.

Furthermore, the first engaging portion 322 is inverted-tooth shaped and arc-shaped. The long slot side S1 of the first slot 324 corresponds to the first engaging portion 322, and the long slot side S1 is also arc-shaped. The first engaging portion 322 has two turns P1, P2 on the first body 320. A distance D between the two turns P1, P2 is less than or equal to a length L of the long slot side S1. The distance D between the two turns P1, P2 is equal to a length of the first engaging portion 322. In other words, the length L of the long slot side S1 is greater than or equal to the length of the first engaging portion 322. Accordingly, the first slot 324 can provide the first engaging portion 322 with sufficient space for elastic deformation, so as to avoid excessive interference of the first engaging portion 322 and the first inner hole 300 of the first side frame 30.

The first slot 324 has a fourth section 3240, a fifth section 3242, and a sixth section 3244 corresponding to the first section 3220, the second section 3222, and the third section 3224, respectively. The fourth section 3240 and the sixth section 3244 are located at opposite sides of the first slot 324, and the fifth section 3242 is locate between the fourth section 3240 and the sixth section 3244. A width W2 of the fifth section 3242 is greater than a width W1 of the fourth section 3240 or a width W3 of the sixth section 3244. Furthermore, the first body 320 has a head end 326. The fourth section 3240 is close to the head end 326, and the sixth section 3244 is away from the head end 326. In this embodiment, the width W2 of the fourth section 3240 can be greater than the width W3 of the sixth section 3244, but is not limited thereto.

In this embodiment, the height H1 of the first section 3220 of the first engaging portion 322 can be slightly less than an inner diameter of the first inner hole 300 of the first side frame 30 for assembly convenience. Furthermore, the height of the first engaging portion 322 increases gradually from the first section 3220 and the third section 3224 toward the second section 3222 respectively, meaning that the height H2 of the second section 322 of the first engaging portion 322 is greater than the inner diameter of the first inner hole 300 of the first side frame 30, so as to make the first side frame 30 tightly assembled with the corner key 32. During the assembly process of the first side frame 30 and the corner key 32, excessive interference between the first inner hole 300 of the first side frame 30 and the first engaging portion 322 of the corner key 32 neither influences assembly quality of the frame assembly 3 nor damages the first engaging portion 322 of the corner key 32 since the first engaging portion 322 is inverted-tooth shaped and the first slot 324 provides the first engaging portion 322 with sufficient space for elastic deformation. After the assembly process of the side frame 30 and the corner key 32 is completed, the deformed first engaging portion 322 may generate a self-tightening force due to its flexibility so as to grip the first inner hole 300 of the first side frame 30 tightly. Accordingly, after the assembly process of the side frame 30 and the corner key 32 is completed, there is no need to additionally utilize a mounting process to make the first engaging portion 322 grip the first inner hole 300 of the first side frame 30 tightly.

Figure 5:
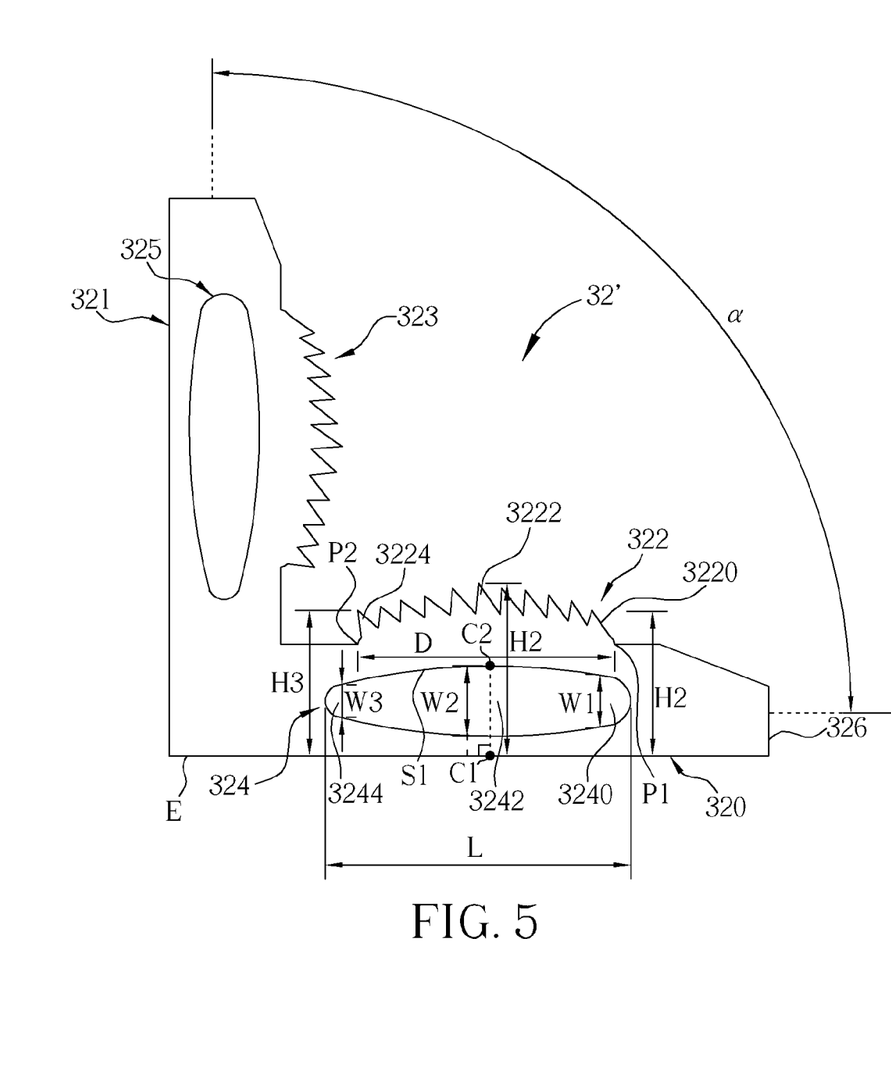
FIG. 5 is a diagram of a corner key according to another embodiment of the present invention.

Please refer to FIG. 5, which is a diagram of a corner key 32' according to another embodiment of the present invention. A major difference between the corner key 32' and the corner key 32 is that a line from the middle point C1 of the long body side E of the first body 320 of the corner key 32' to the middle point C2 of the long slot side S1 of the first slot 324 is substantially perpendicular to the first body 320. In this embodiment, the structure of the second body 321 is substantially identical to the structure of the first body 320, and the related description is therefore omitted herein.

Figure 6:
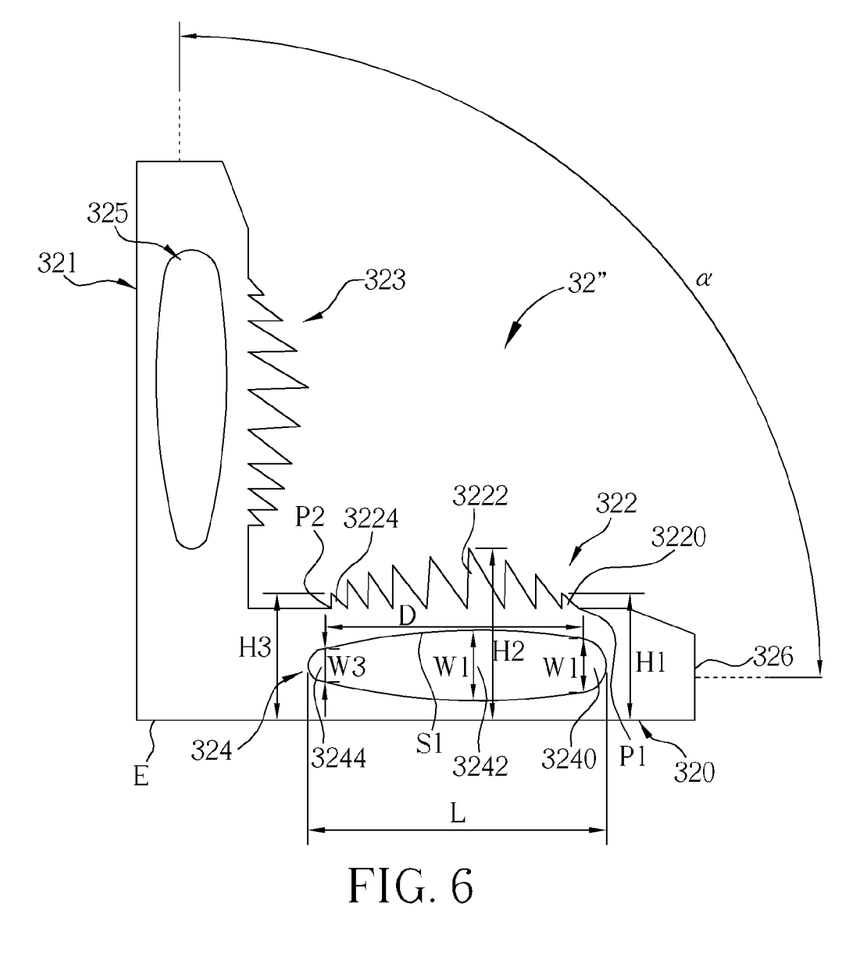
FIG. 6 is a diagram of a corner key according to another embodiment of the present invention.

Please refer to FIG. 6, which is a diagram of a corner key 32" according to another embodiment of the present invention. A major difference between the corner key 32" and the corner key 32 is that the teeth on the first engaging portion 322 of the corner key 32" are arranged linearly. The height of each tooth on the second section 3222 is greater than the height of each tooth on the first section 3220 and the height of each tooth on the third section 3224, so as to make the height H2 of the second section 322 greater than the height H1 of the first section 3220 and the height H3 of the third section 3224. In this embodiment, the structure of the second engaging portion 323 is substantially identical to the structure of the first engaging portion 322, and the related description is therefore omitted herein.

Figure 7:
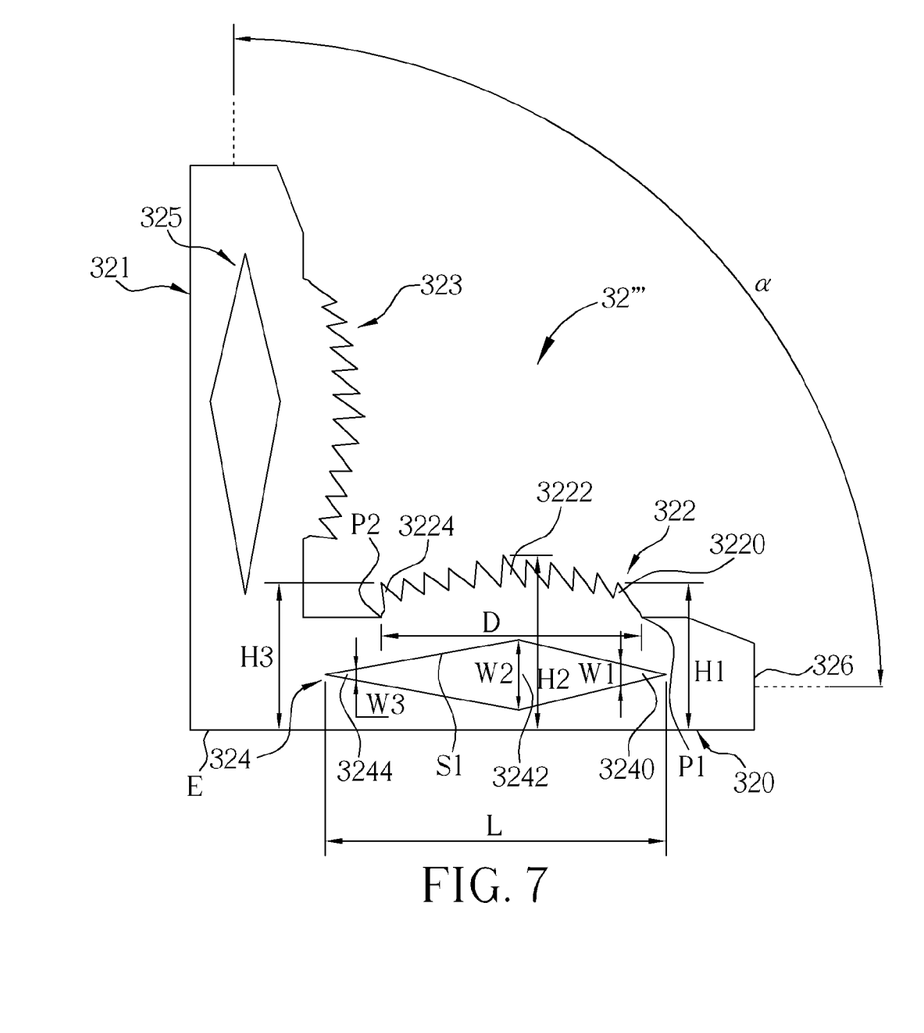
FIG. 7 is a diagram of a corner key according to another embodiment of the present invention.

Please refer to FIG. 7, which is a diagram of a corner key 32''' according to another embodiment of the present invention. A major difference between the corner key 32''' and the corner key 32 is that the long slot side S1 of the first slot 324 of the corner key 32''' is formed by at least two lines. As shown in FIG. 7, the long slot side S1 of the first slot 324 of the corner key 32''' is formed by two lines. In other words, in the present invention, the first slot 324 can be arc-shaped or polygon-shaped based on the needed amount of elastic deformation and resilience of the first engaging portion 322. In this embodiment, the structure of the second slot 325 is substantially identical to the structure of the first slot 324, and the related description is therefore omitted herein.

Figure 8:
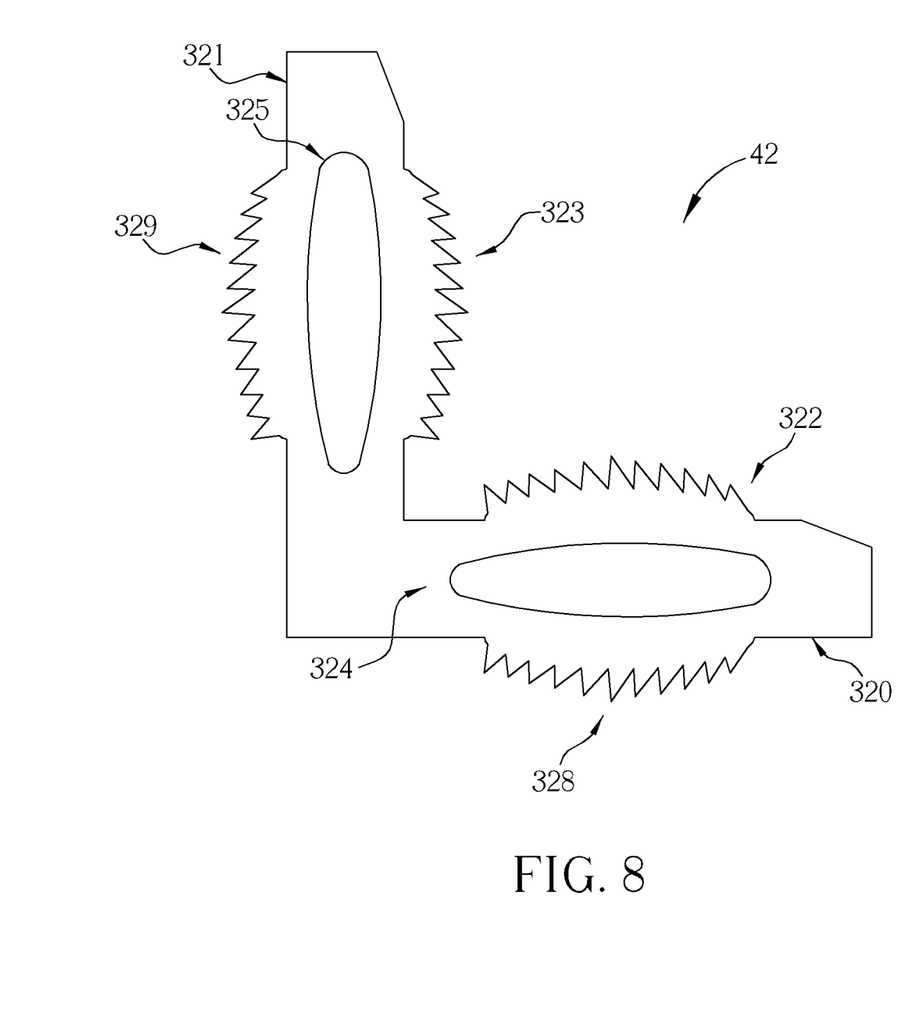
FIG. 8 is a diagram of a corner key according to another embodiment of the present invention.

Please refer to FIG. 8, which is a diagram of a corner key 42 according to another embodiment of the present invention. A major difference between the corner key 42 and the corner key 32 is that the corner key 42 further includes a third engaging portion 328 and a fourth engaging portion 329. The third engaging portion 328 is disposed on the surface of the first body 320 and is opposite to the first engaging portion 322, and the fourth engaging portion 329 is disposed on the surface of the second body 321 and is opposite to the second engaging portion 323. The first slot 324 is located between the first engaging portion 322 and the third engaging portion 328, and the second slot 325 is located between the second engaging portion 323 and the fourth engaging portion 329. The structures of the third engaging portion 328 and the fourth engaging portion 329 are substantially identical to the structures of the first engaging portion 322, and the related description is therefore omitted herein. Via the design that the first engaging portion 322 and the third engaging portion 328 are formed at opposite sides of the first body 320 respectively and the design that the second engaging portion 323 and the fourth engaging portion 329 are formed at opposite sides of the second body 321 respectively, the first side frame 30 and the second side frame 31 can be fixed more firmly via the corner key 42.

Figure 9:
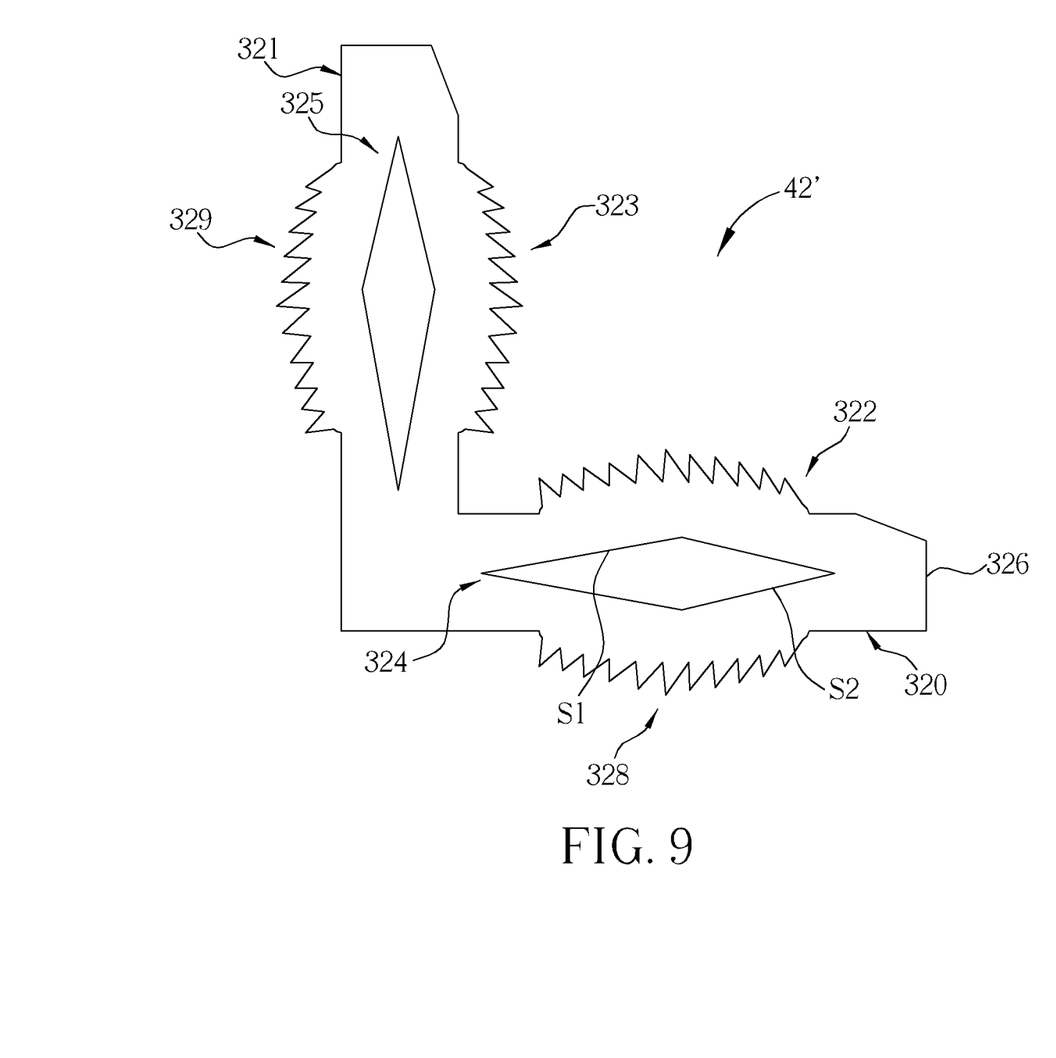
FIG. 9 is a diagram of a corner key according to another embodiment of the present invention.

Please refer to FIG. 9, which is a diagram of a corner key 42' according to another embodiment of the present invention. A major difference between the corner key 42' and the corner key 42 is that both of the long slot sides S1, S2 of the first slot 324 of the corner key 42' respectively corresponding to the first engaging portion 322 and the third engaging portion 328 are formed by at least two straight lines. As shown in FIG. 9, both of the long slot sides S1, S2 of the first slot 324 of the corner key 42' are formed by two straight lines. In other words, the first slot 324 can be arc-shaped or polygon-shaped based on the needed amount of elastic deformation and resilience of the first engaging portion 322 and the third engaging portion 328. In this embodiment, the structure of the second slot 325 is substantially identical to the structure of the first slot 324, and the related description is therefore omitted herein.

Figure 10:
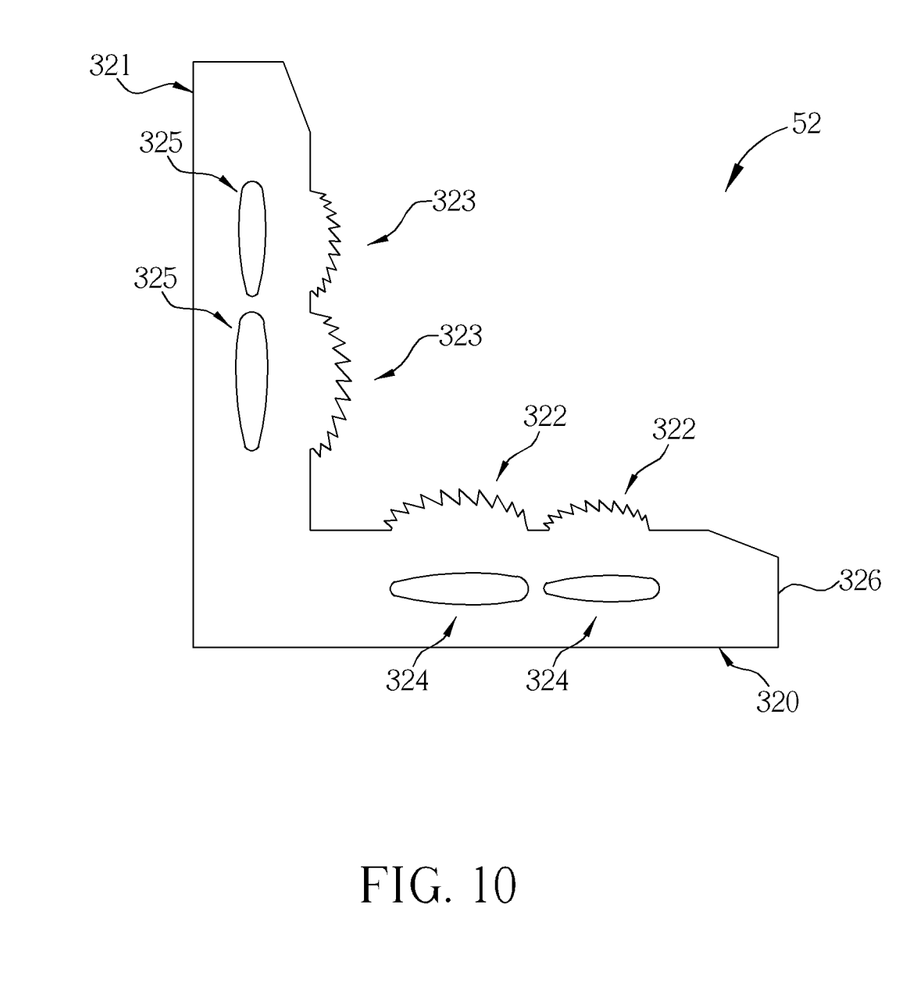
FIG. 10 is a diagram of a corner key according to another embodiment of the present invention.

Please refer to FIG. 10, which is a diagram of a corner key 52 according to another embodiment of the present invention. A major difference between the corner key 52 and the corner key 32 is that a plurality of first slots 324 is formed in the first body 320 of the corner key 52 and the corner key 52 further includes a plurality of first engaging portions 322 disposed on the surface of the first body 320 corresponding to the plurality of first slots 324. There are two first engaging portions 322 and two first slots 324 depicted in FIG. 10 (but not limited thereto). In other words, number of the first engaging portion 322 and the first slot 324 depends on the practical application of the corner key 52. As shown in FIG. 10, the two first engaging portions 322 are arranged linearly, and each first slot 324 is formed corresponding to one of the two first engaging portions 322 respectively. In this embodiment, the first engaging portion 322 close to the head end 326 can be a tooth structure with tiny and dense teeth for assembly convenience, and the first engaging portion 322 away from the head end 326 can be a tooth structure with large and sparse teeth for increasing interference between the first engaging portion 322 of the corner key 52 and the first side frame 30. In this embodiment, the structures of plural second slots 325 and plural second engaging portions 323 are substantially identical to the structures of plural first slots 324 and plural first engaging portions 322, and the related description is therefore omitted herein.

Figure 11:
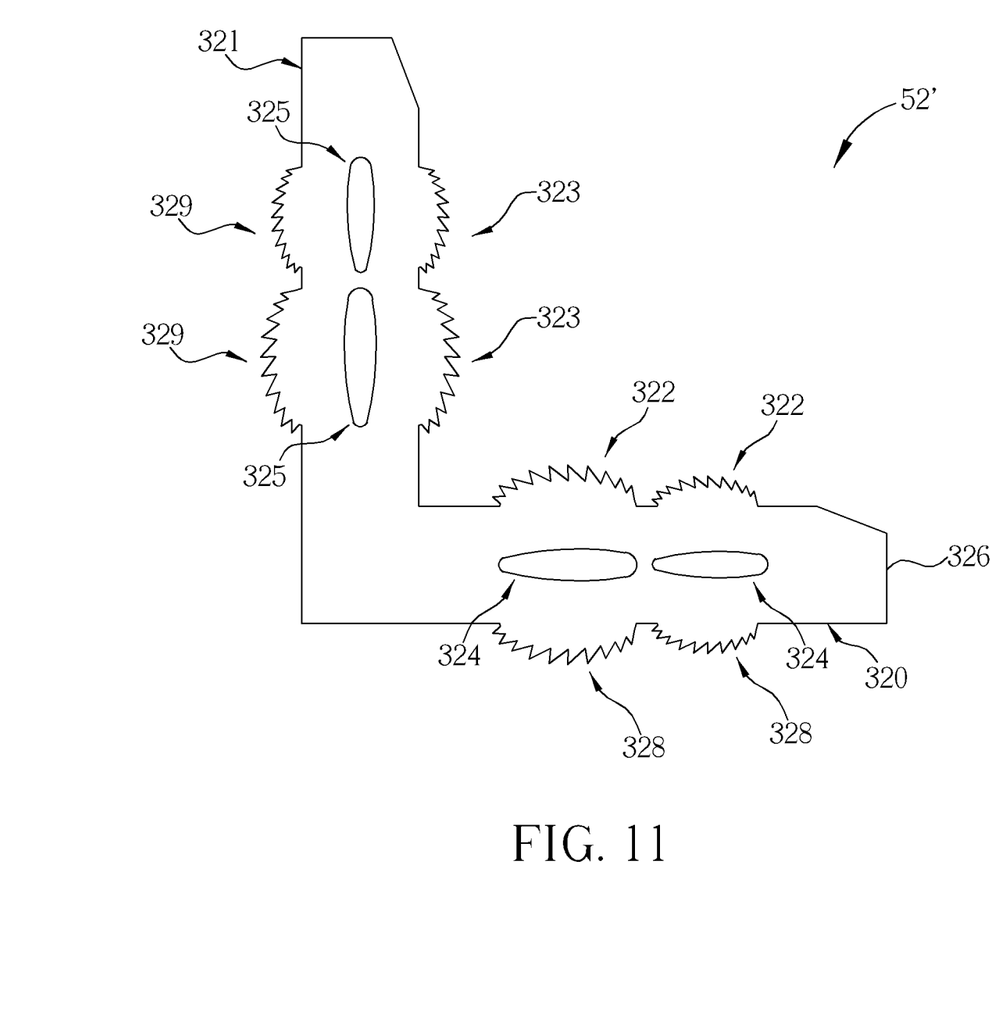
FIG. 11 is a diagram of a corner key according to another embodiment of the present invention.

Please refer to FIG. 11, which is a diagram of a corner key 52' according to another embodiment of the present invention. A major difference between the corner key 52' and the corner key 52 is that the corner key 52' further includes a plurality of third engaging portions 328 disposed on the surface of the first body 320 and opposite to the plurality of first engaging portions 322. As shown in FIG. 11, each first slot 324 is located between one of the first engaging portions 322 and one of the third engaging portions 328. To be noted, the function of the plurality of third engaging portions 328 is substantially the same as the function of the plurality of first engaging portions 322. Furthermore, the functions of the second engaging portions 323 and the fourth engaging portions 329 are substantially the same as the functions of the first engaging portions 322 and the third engaging portions 328, and the related description is therefore omitted herein.

Compared with the prior art, the present invention utilizes the design that there is the slot formed on the corner key corresponding to the engaging portion to provide the engaging portion with sufficient space for elastic deformation during the assembly process of the side frame and the corner key. Thus, excessive interference between the side frame and the corner key neither influences the assembly quality of the frame assembly nor damages the engaging portion of the corner key. After the assembly process of the side frame and the corner key is completed, the deformed engaging portion can generate a self-tightening force due to its elasticity so as to grip the side frame tightly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A corner key comprising:
   a first body having a plurality of first slots formed therein and a head end; and
   a plurality of first engaging portions disposed on a surface of the first body corresponding to the plurality of first slots, each first engaging portion having a first section, a second section, and a third section, the first section and the third section being located at opposite sides of the first engaging portion, the second section being located between the first section and the third section, a height of the second section being greater than a height of the first section or a height of the third section, the first engaging portion close to the head end being a tooth structure with tiny and dense teeth, the first engaging portion away from the head end being a tooth structure with large and sparse teeth.

2. The corner key of claim 1, wherein the first body has a long body side, one of the plurality of first slots has a long slot side, and a line from a middle point of the long body side to a middle point of the long slot side is substantially perpendicular to the first body.

3. The corner key of claim 1, wherein the first body has a long body side, one of the plurality of first slots has a long slot side, and an acute angle is included by the first body and a line from a middle point of the long body side to a middle point of the long slot side, and a distance between the first section and the middle point of the long slot side is less than a distance between the third section and the middle point of the long slot side.

4. The corner key of claim 1, further comprising:
   a second body connected to the first body and having a second slot formed therein, an angle being included between the first body and the second body; and
   a second engaging portion disposed on a surface of the second body corresponding to the second slot;
   wherein the structures of the second body, the second slot, and the second engaging portion are identical to the structures of the first body, the first slot, and the first engaging portion, respectively.

5. The corner key of claim 1, wherein each first slot has a long slot side, and the long slot side is arc-shaped.

6. The corner key of claim 1, wherein each first slot has a long slot side formed by at least two straight lines.

7. The corner key of claim 1, wherein each first engaging portion is inverted-tooth shaped.

8. The corner key of claim 1, wherein one of the plurality of first slots has a long slot side, one of the plurality of first engaging portions has two turns on the first body, and a distance between the two turns is less than or equal to a length of the long slot side.

9. The corner key of claim 1, wherein each first slot has a fourth section, a fifth section and a sixth section, the fourth section and the sixth section are located at opposite sides of each first slot, the fifth section is located between the fourth section and the sixth section, and a width of the fifth section is greater than a width of the fourth section or a width of the sixth section.

10. The corner key of claim 9, wherein the fourth section is close to the head end, the sixth section is away from the head end, and a width of the fourth section is greater than a width of the sixth section.

11. The corner key of claim 1, further comprising a plurality of third engaging portions disposed on the surface of the first body opposite to the plurality of first engaging portions, each first slot being located between one of the first engaging portions and one of the third engaging portions;
wherein the structure of each third engaging portion is substantially identical to the structure of the corresponding first engaging portion.

12. A frame assembly comprising:
a first side frame having a first inner hole; and
a corner key comprising:
a first body having a plurality of first slots formed therein and a head end for inserting into the first inner hole; and
a plurality of first engaging portions disposed on a surface of the first body corresponding to the plurality of first slots, each first engaging portion having a first section, a second section, and a third section, the first section and the third section being located at opposite sides of the first engaging portion, the second section being located between the first section and the third section, a height of the second section being greater than a height of the first section or a height of the third section, the first engaging portion close to the head end being a tooth structure with tiny and dense teeth, the first engaging portion away from the head end being a tooth structure with large and sparse teeth.

13. The frame assembly of claim 12, wherein the first body has a long body side, one of the plurality of first slots has a long slot side, and a line from a middle point of the long body side to a middle point of the long slot side is substantially perpendicular to the first body.

14. The frame assembly of claim 12, wherein the first body has a long body side, one of the plurality of first slots has a long slot side, and an acute angle is included by the first body and a line from a middle point of the long body side to a middle point of the long slot side, and a distance between the first section and the middle point of the long slot side is less than a distance between the third section and the middle point of the long slot side.

15. The frame assembly of claim 12, wherein the frame assembly further comprises a second side frame having a second inner hole, and the corner key further comprises:

a second body connected to the first body and having a second slot formed therein for inserting the second inner hole, an angle being included between the first body and the second body; and
a second engaging portion disposed on a surface of the second body corresponding to the second slot;
wherein the structures of the second body, the second slot, and the second engaging portion are identical to the structures of the first body, the first slot, and the first engaging portion, respectively.

16. The frame assembly of claim 12, wherein each first slot has a long slot side, and the long slot side is arc-shaped.

17. The frame assembly of claim 12, wherein each first slot has a long slot side formed by at least two straight lines.

18. The frame assembly of claim 12, wherein each first engaging portion is inverted-tooth shaped.

19. The frame assembly of claim 12, wherein one of the plurality of first slots has a long slot side, one of the plurality of first engaging portions has two turns on the first body, and a distance between the two turns is less than or equal to a length of the long slot side.

20. The frame assembly of claim 12, wherein each first slot has a fourth section, a fifth section and a sixth section, the fourth section and the sixth section are located at opposite sides of each first slot, the fifth section is located between the fourth section and the sixth section, and a width of the fifth section is greater than a width of the fourth section or a width of the sixth section.

21. The frame assembly of claim 20, wherein the fourth section is close to the head end, the sixth section is away from the head end, and a width of the fourth section is greater than a width of the sixth section.

22. The frame assembly of claim 12, wherein the corner key further comprises a plurality of third engaging portions disposed on the surface of the first body opposite to the plurality of first engaging portions, each first slot is located between one of the first engaging portions and one of the third engaging portions, and the structure of each third engaging portion is substantially identical to the structure of the corresponding first engaging portion.

23. The corner key of claim 1, wherein each first slot has a long slot side, and a length of each long slot side is greater than or equal to a length of each first engaging portion.

24. The frame assembly of claim 12, wherein each first slot has a long slot side, and a length of each long slot side is greater than or equal to a length of each first engaging portion.

* * * * *